(12) United States Patent
Rakowski et al.

(10) Patent No.: US 8,086,698 B2
(45) Date of Patent: Dec. 27, 2011

(54) SYNCHRONIZING CONFIGURATION INFORMATION AMONG MULTIPLE CLIENTS

(75) Inventors: Brian D. Rakowski, Menlo Park, CA (US); Kristina Holst, San Francisco, CA (US); Aaron Boodman, San Francisco, CA (US); Marria S. Nazif, San Francisco, CA (US); Fritz J. Schneider, San Francisco, CA (US); Glen Murphy, San Francisco, CA (US)

(73) Assignee: Google Inc., Mountain View, CA (US)

( * ) Notice: Subject to any disclaimer, the term of this patent is extended or adjusted under 35 U.S.C. 154(b) by 539 days.

(21) Appl. No.: 11/422,053

(22) Filed: Jun. 2, 2006

(65) Prior Publication Data

US 2007/0283011 A1 Dec. 6, 2007

(51) Int. Cl.
G06F 15/16 (2006.01)
(52) U.S. Cl. ........ 709/218; 709/203; 709/217; 709/219; 709/240
(58) Field of Classification Search .................. 709/203, 709/217, 218, 219, 248, 229; 713/182, 184, 713/100, 150, 155, 201
See application file for complete search history.

(56) References Cited

U.S. PATENT DOCUMENTS

| | | | |
|---|---|---|---|
| 6,405,318 B1 * | 6/2002 | Rowland | 726/22 |
| 7,035,879 B2 | 4/2006 | Shi et al. | 707/203 |
| 7,149,308 B1 * | 12/2006 | Fruehauf et al. | 380/44 |
| 7,200,582 B1 | 4/2007 | Smith | 706/47 |
| 7,437,484 B2 | 10/2008 | Auriemma et al. | 709/248 |
| 7,490,775 B2 | 2/2009 | Biderman | 235/472.01 |
| 2003/0174842 A1 * | 9/2003 | Challener | 380/277 |
| 2005/0050112 A1 | 3/2005 | Chandrasekaran | 707/203 |
| 2005/0108297 A1 * | 5/2005 | Rollin et al. | 707/201 |
| 2005/0120091 A1 | 6/2005 | Casais et al. | 709/217 |
| 2005/0208803 A1 * | 9/2005 | Rohatgi et al. | 439/159 |
| 2005/0210270 A1 * | 9/2005 | Rohatgi et al. | 713/186 |
| 2006/0059530 A1 * | 3/2006 | Spielman et al. | 725/132 |
| 2006/0106879 A1 * | 5/2006 | Zondervan et al. | 707/200 |
| 2006/0147043 A1 * | 7/2006 | Mann et al. | 380/270 |
| 2006/0155773 A1 | 7/2006 | Drouet et al. | 707/200 |
| 2006/0280207 A1 * | 12/2006 | Guarini et al. | 370/524 |
| 2007/0067309 A1 * | 3/2007 | Klein et al. | 707/10 |
| 2010/0100724 A1 * | 4/2010 | Kaliski, Jr. | 713/155 |

FOREIGN PATENT DOCUMENTS

| | | |
|---|---|---|
| WO | WO 00/51025 A1 | 8/2000 |
| WO | WO 01/67286 A2 | 9/2001 |
| WO | WO 0167286 * | 9/2001 |
| WO | WO 2004/054298 * | 6/2004 |

OTHER PUBLICATIONS

International Search Report and Written Opinion for International Application No. PCT/US2007/070277, mailed Jan. 24, 2008, 12 pages.

* cited by examiner

*Primary Examiner* — Djenane Bayard
(74) *Attorney, Agent, or Firm* — Morgan, Lewis & Bockius LLP

(57) ABSTRACT

A user of multiple client devices (clients) makes application configuration changes on the clients from time to time. The configuration changes are stored in a local event log on each client, as well as in a synchronization server. When one of the clients connects to the synchronization server, for example when the user logs into the synchronization server while using a respective client, the configuration information in the server and client is synchronized. Conflicts, if any, in the configuration changes for a respective application are resolved in accordance with a conflict resolution procedure or conflict resolution rules associated with that application.

35 Claims, 9 Drawing Sheets

SYNCHRONIZING CONFIGURATION INFORMATION AMONG MULTIPLE CLIENTS

RELATED APPLICATIONS

The present invention is related to patent application Ser. No. 11/422,054, "Resolving Conflicts while Synchronizing Configuration Information Among Multiple Clients," filed Jun. 2, 2006, which is hereby incorporated by reference.

FIELD OF THE INVENTION

The present invention relates generally to synchronization of configuration information among multiple clients. More specifically, the present invention relates generally to a system and method for synchronizing configuration information for applications on two or more clients (e.g., computers or other client devices) so as to maintain a consistent configuration as a user moves from one client to another.

BACKGROUND

With ever decreasing costs for technology and the increases in interconnectivity provided by networks such as the Internet or World Wide Web (WWW), many users are performing common tasks on more than one computer. For example, a user may have more than one computer at work, or multiple computers at different locations, such as in different offices or at work and at home. In addition, a respective computer may be used by more than one user. When using the respective computer, a user will often accumulate, define or assemble valuable data, such as configuration information for one or more applications running on the respective computer. In such a multi-user environment, many users would like to continue using the same valuable information across multiple computer platforms.

Some existing approaches allow configuration information to be stored locally. It is challenging, however, to synchronize the locally stored configuration information across multiple separate computers. Other existing approaches allow configuration information for a first computer to be stored on a second computer. The stored configuration information may be used to update the configuration information on the first computer or another computer at a later time. Such a synchronization operation, however, is often a full set up, i.e., the stored configuration information replaces all of the configuration information on the first computer or the other computer. In addition to being demanding of system resources, such approaches may also be inadequate. There is no detailed information available to determine what subset of the configuration information has been changed. This may be important, especially if a conflict arises between the configuration state of an application used by a user on two separate computers.

There is a need, therefore, for improved storage and synchronizing of valuable configuration information across multiple computers.

SUMMARY

A user of multiple client devices or devices (clients) makes application configuration changes on the clients from time to time. The configuration changes are stored in a local event log on each client, as well as in a synchronization server. When one of the clients connects to the synchronization server, for example when the user logs into the synchronization server while using a respective client, the configuration information stored in the server and in the client is synchronized. Conflicts, if any, in the configuration changes for a respective application are resolved in accordance with a conflict resolution procedure or conflict resolution rules associated with that application. Conflicts may arise, for example, when inconsistent configuration changes are made on two of the clients.

At a server computer (server), login information, such as a user name, is received from a first client device at a server using a network. Configuration information is provided to the first client device using the network. The configuration information is to configure a user-specified portion of one or more applications on the first client device by merging with existing configuration information for the one or more applications on the first client device.

In some embodiments, prior to receiving the login information from the first client device, the server may receive encrypted configuration information from a second client device. The configuration information provided to the first client device includes the encrypted configuration information, which was encrypted by the second client device using a user key associated with the user name.

In some embodiments, the server may provide an encrypted user key to the first client device prior to sending the encrypted configuration information to the first client device. In some embodiments, the encrypted user key comprises the user key encrypted by a user PIN. In some embodiments, the aforementioned login information includes a hashed PIN, and the server validates the user only if the received hashed PIN matches a stored hashed PIN associated with the user name.

In some embodiments, the aforementioned login information includes a user verification value associated with the user name, and the server validates the user only if the received user verification value matches a stored user verification value associated with the user name.

In some embodiments, the server receives further an update from the first client device, wherein the update corresponds to one or more changes in configuration information at the first client device in accordance with user activity, and stores the update in an event log. In some embodiments, the server provides respective configuration information to a second client device using the network, the configuration information provided to the second client device including the update received from the first client.

In some embodiments, the server determines a set of configuration updates since a specified time, excluding any configuration updates superseded by later configuration updates, and sends the determined set of configuration updates to the first client device.

In some embodiments, the server stores configuration information for a plurality of respective users in respective event logs, each event log including a sequence of configuration updates received from one or more client devices.

In some embodiments, the configuration information includes a browser state, which includes at least two types of items selected from the group consisting of bookmarks, passwords, open tabs, open windows, cookies, user history, data for auto-completion of forms, and window layout information.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Figure 1:
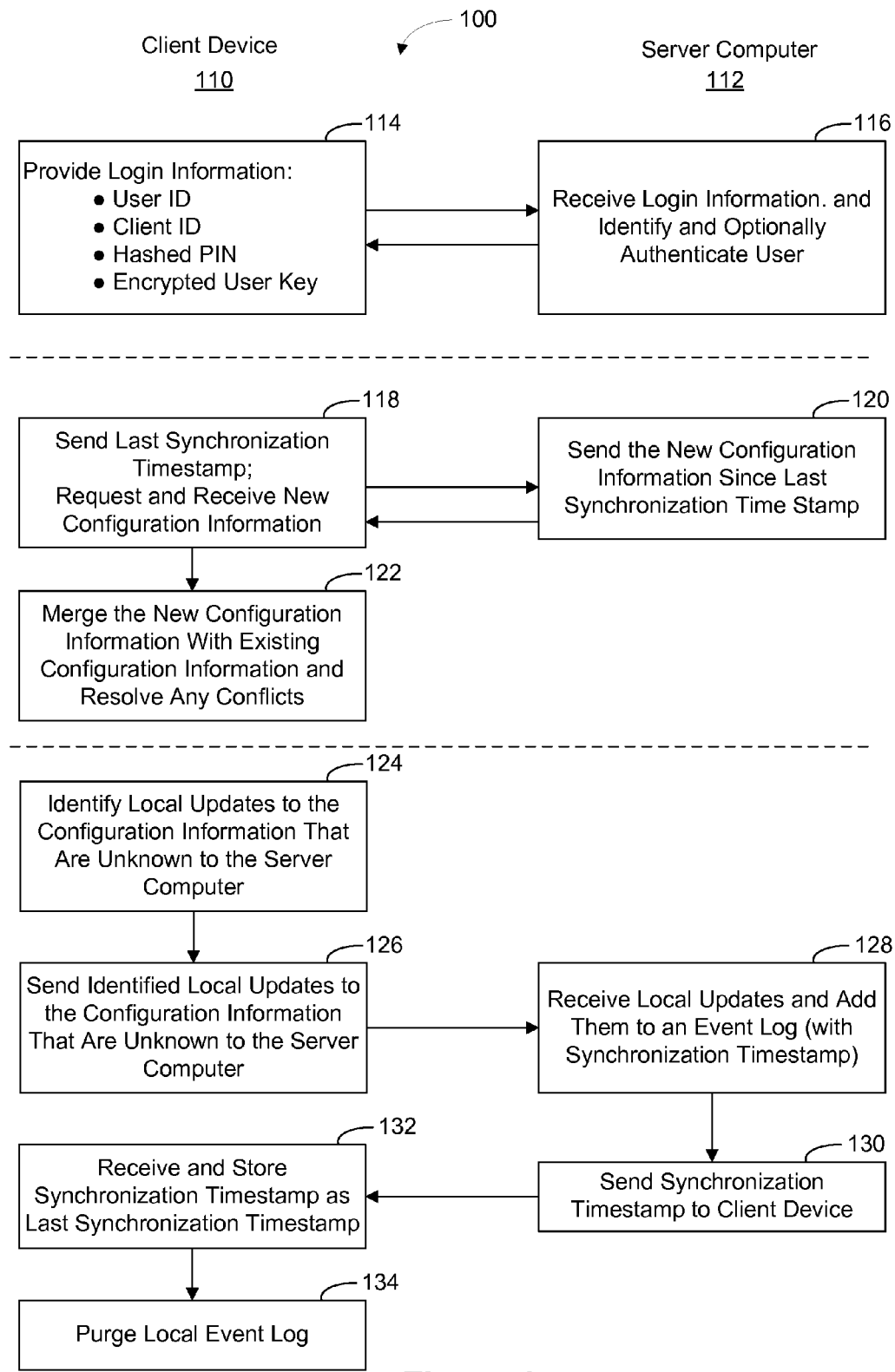
FIG. 1 is a flow diagram illustrating an embodiment of interaction between a client device and a server computer.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Synchronization of configuration information for one or more users on one or more computers is described. The configuration information may correspond to one or more applications on a client device. The one or more applications to be synchronized may be pre-defined or specified by a user. The one or more applications may be integrated with a browser (such as Internet Explorer from Microsoft Corporation, Firefox from Mozilla, and/or Safari from Apple Computer) that is used to view websites and web pages on an intranet and/or the Internet. The configuration information may include a browser state. The configuration information may include one or more of the following: bookmarks, passwords, open tabs, open windows, cookies, user history (such as a search history for a search engine or a history of web pages visited), data for auto-completion of forms, address state, and layout information. In other embodiments, the configuration information may correspond to a portion of a toolbar (e.g., toolbar options and/or settings selected by a user) and/or at least a portion of an operating system (e.g., folder settings, security settings, search preference settings, permissions settings), such as Windows from Microsoft Corporation and/or MAC OS from Apple Computer.

At least a portion of the configuration information, such as changes to a configuration state on a respective client device, may be stored on the client device and/or on a server computer. In some embodiments, at least the portion of the configuration information is stored on the server computer when the user of the client device is logged into a user account on the server computer. Updates to the stored configuration information may be provided to the server computer when the user makes changes to the configuration state of the one or more applications and/or after a pre-determined time interval since a last update was provided has elapsed. The updates may correspond to user activity. In some embodiments, at least the portion of the configuration information is stored on the client device when the user of the client device is not logged into the user account on the server computer and/or when communication between the client device and the server computer is currently unavailable (for example, if there is a network failure or the client device is disconnected from the network). Changes to the configuration information during such an interval that are unknown to the server computer may be provided to the server computer when the user logs in to the user account and/or when communication with the server computer is available.

In some embodiments, the synchronization of the configuration information at the client device may be implemented, at least in part, using a synchronization application program or module that is integrated and/or embedded into a browser. Such an integrated synchronization application program or module may be implemented using a program language such as JavaScript, i.e., the browser may function as a Virtual Machine. In some embodiments, the synchronization application program or module may be resident on the client device. For example, the user may download and install the synchronization application program or module on one or more client devices.

In some embodiments, the client device may include a synchronization manager for identifying and resolving any conflicts between configuration information updates provided to the client device by the server computer and the existing configuration information on the client device. Such conflicts may be resolved in accordance with pre-defined conflict rules for the one or more applications.

Configuration information may be communicated between the client device and the server, and vice versa, using a protocol such as Hyper Text Transfer Protocol (HTTP). At least some of the configuration information that is communicated may be encrypted using a user key. The user key may be generated at the client device when the user first registers to use the configuration synchronization services of the server computer. In some embodiments, the user key is a token or other value generated using a random or a pseudorandom process. The user key is encrypted using a second user key (e.g., the user's PIN) that is provided by the user, to produce an encrypted user key. In some embodiments, the user's PIN is provided by the user the first time that the user synchronizes a particular client with the user's configuration information stored on the server, and thereafter the user's PIN is automatically retrieved by the client from a locally stored copy of the PIN. In some embodiments, the user key is stored on the client device (for example, in one or more text or cookie files), in clear text form, the encrypted user key is stored on the server computer, the user's PIN is stored on the client device in clear text form (e.g., in a text or cookie file) and the hashed user's PIN is stored on the server computer (for authenticating the user). Since the server computer does not have the user key and also does not have the user's PIN, the server computer is incapable of decrypting the encrypted configuration information sent by the user's client devices to the server computer. In other embodiments, the user key, the encrypted user key, the user's PIN and the hashed user's PIN may be stored in other locations than the ones just described.

Configuration information on the client device and/or the server computer may be stored in an event log or file. The event log may include updates to one or more components or items in the one or more applications. The updates may include a time ordered sequence of name-value pairs that correspond to respective components or items. When synchronizing the configuration information for the one or more applications with the stored configuration information, the most recent updates are applied. For example, if the last time at which the configuration information in client device A was synchronized is time T1, and the user logs into the synchronization service on client device A again at time T2, then updates (except as explained below) known to the server computer having times after time T1 will be sent to the client for merging with client device A's configuration information. When more than one update for a specific property of a component or configuration item is recorded in the server computer's event log for the period after T1, only the most recent update to the specific property of the component or configuration item is sent to client device A. If two updates to two different properties of a component (e.g., the name and URL of a bookmark) are recorded in the server computer's event log for the period after T1, and neither update is superseded by later updates, both updates are sent to the client device A.

Attention is now directed towards embodiments of synchronization of configuration information. FIG. 1 is a flow diagram illustrating an embodiment of a synchronization method 100. FIG. 1 provides an overview of the types interactions that occur between the client device 110 (sometimes called the client or the client computer) and the server computer 112 (sometimes called the server, or the synchronization server) during performance of the synchronization method 100.

Prior to synchronizing configuration information, the client device 110 receives login information from a user (114). The server 112 receives the login information. If the login information corresponds to a user account on the server, the server identifies and authenticates the user (116). In an exemplary embodiment, the login information provided to the server includes a user name (e.g., a user ID), an identification code or number for the client device 110 (a client ID), and a hashed PIN. The hashed PIN is produced by applying a hash function, or other one-way function, to a user PIN (personal identification number) entered by the user.

In some embodiments, operations 114 and 116 are implemented in a slightly more complicated way. In particular, the user submits a username and password to the server (or to another server, such as an accounts administration server, acting in concert with server 112). If the login is successful, the server sends a cookie to the client. Then the client sends the cookie (which may include the username, or may indirectly reference the username) to the synchronization server 112 to verify that a user account exists on the synchronization server. If not, the process for establishing a new user account is initiated, as described below. If the user account does exist, the login procedure (114, 116) is complete. After a successful login, the client sends one or more synchronization requests to the synchronization server, each of which includes the cookie, the client ID, and the encrypted user key. The encrypted user key is used by the server to validate the client prior to processing each request received from the client.

In some embodiments, if the client device 110 indicates to the server 112 that the client device 110 is not in possession of the user key corresponding to the user name, the server 112 provides an encrypted user key to the client device. This may happen, for instance, when the user first uses a new client device 110, or when the user is using the client device 110 as a guest and does not intend for the user's configuration information to remain resident on the client device after the user session on the client device ends. The encrypted user key, is received by the client device from the server, and is decrypted by the client device using the user PIN, thereby regenerating the user key. In some embodiments, when the user is a guest who is only temporarily using the client device 110, the encrypted user key and configuration information downloaded from the synchronization server are stored only in volatile memory (e.g., RAM) of the client device 110 so as to ensure that this information is not retained by the client device after the user's session with the synchronization server terminates. Alternately, the encrypted user key and configuration information is not downloaded to the client device at all, and instead is temporarily stored in a proxy device (not shown, but coupled to both the client device 110 and the server 112), which is programmed to purge all such information when the user's session with the synchronization server terminates.

Some of the login information (e.g., the user name) may be provided by the user. Some of the login information, however, may be stored on the client device 110 and may be provided to the server computer 112 for the user when the user attempts to login. For example, the client ID may be locally and durably stored in the client device 110 and provided to the server computer during login.

After the client device has been logged in and authenticated, the client device sends to the server a "last synchronization timestamp" (118), which corresponds to a last or most recent time when the configuration information was synchronized between the client device and the server. In addition, the client device 110 requests new configuration information from the server (118). If the server has new configuration information, having timestamps after the timestamp of the last synchronization operation by the client device, the server provides the new configuration information to the client device (120). The new configuration information includes updates to the configuration information that have occurred since the last synchronization timestamp provided by the client device 110. For example, while working on another client device (not shown in FIG. 1) the user may have modified the configuration information on the other computer after the last synchronization timestamp for the client device 110. These modifications are associated with the same user via the user ID or user name provided during login with the server.

The updates to be sent by the server computer 112 to the client device 110 are identified from an event log stored in the server computer 112 (or in another backend computer coupled to the server computer 112) for the user account, by reviewing and filtering the set of configuration updates in the event log since a last synchronization time between the server and client. The set of updates is filtered to exclude updates that have been superseded by later updates. The resulting filtered set of updates, herein called the identified updates, are sent by the server 112 to the client 110 (120).

The configuration information updates sent by the server computer 112 are merged with existing configuration information on the client device 110 and any conflicts between the new configuration information and "offline" changes to the configuration information made by the client device are resolved (122). Conflicts may arise if the user modifies the configuration information on the client device 110 when the user is not logged into the user account and/or when the user is unable to communicate with the server computer 112. These changes to the client device's configuration information are sometimes herein called "offline" changes (even if the user is connected to the Internet) while such configuration changes are made. Conflict resolution is discussed further below with reference to FIGS. 4 and 6. It should be noted, however, that the conflict resolution process may produce new entries in the local event log stored in the client device, reflecting configuration changes that need to be sent to the server (see operation 124, discussed below).

In some embodiments, the user may log in with the server 112 from only one client 110 at a time. For example, if the user attempts to login to the server at a second client device while still logged in at a first client device, the login attempt by the second client device is rejected by the server. This restriction reduces the opportunities for difficult to resolve conflicts between inconsistent configuration changes in the various clients 110 used by a respective user. In another embodiment, the login from the second client is accepted, and the session with the first client is terminated by the server. This embodiment allows a user to move to a second client, while leaving the first client running, and to synchronize configuration updates (if any) with the second client without having to explicitly log off the synchronization server at the first client.

After receiving configuration information (if any) from the server, and merging that configuration information with the locally stored configuration information, the client device 110 identifies local updates to the configuration information that are unknown to the server computer 112 (124). Local updates may add, modify, or delete configuration information for any of the applications whose configuration information is being tracked and synchronized. In some embodiments, the client device stores local updates generated since the last configuration information synchronization with the server in an event log. Each time a configuration change occurs, either due to user activity or due to the conflict resolution process (which is part of the configuration information merging process 122), the client device's event log is updated to include the configuration change. If a configuration change supersedes a prior configuration change that has been recorded in the client device's event log, the outdated information is deleted or overwritten with the information. In this way, the client device's event log does not store any outdated or superseded configuration change information. It is noted that if the client device has not been used since the last synchronization with the server, the client device's event log may be empty—unless the merging process 122 caused one or more configuration changes that need to be sent to the server.

In an alternate embodiment, the client device's event log stores all locally made configuration changes in the order they occur, regardless of whether those changes are caused by user activity or by the configuration information merging process 122. In this embodiment, superseded configuration change are not deleted or overwritten. Instead, when it is time to identify local updates to the configuration information, the identification process 124 filters out superseded configuration changes.

The identified local updates are sent by the client device 110 to the server 112 (126). The server computer 112 receives the local updates and adds them to an event log (128). In some embodiments, operations 124, 126 and 128 (identification and sending of local updates to the server) occur immediately or shortly after the completion of the merge operation 122, described above. Upon confirmation by the server that the local updates have been durably stored by the server, the client device purges or deletes its event log (134). In this way, the client device's event log only stores configuration information updates that have occurred since a last synchronization operation.

In addition, the server associates a timestamp, reflecting the time at the server, with the local updates received from the client device. This timestamp is stored with the configuration changes in an event log in the server, or in another backend computer coupled to the server computer (130). This timestamp is sent to the client device, which stores it as the Last Synchronization Timestamp (132), reflecting the last time that a full synchronization with the server was completed. Since timestamps are assigned only by the server, all updates stored by the server 112 have a consistent time base. In some embodiments, the local event log is purged (134) after the client device receives the synchronization timestamp from the server (130, 132).

Figure 2A:
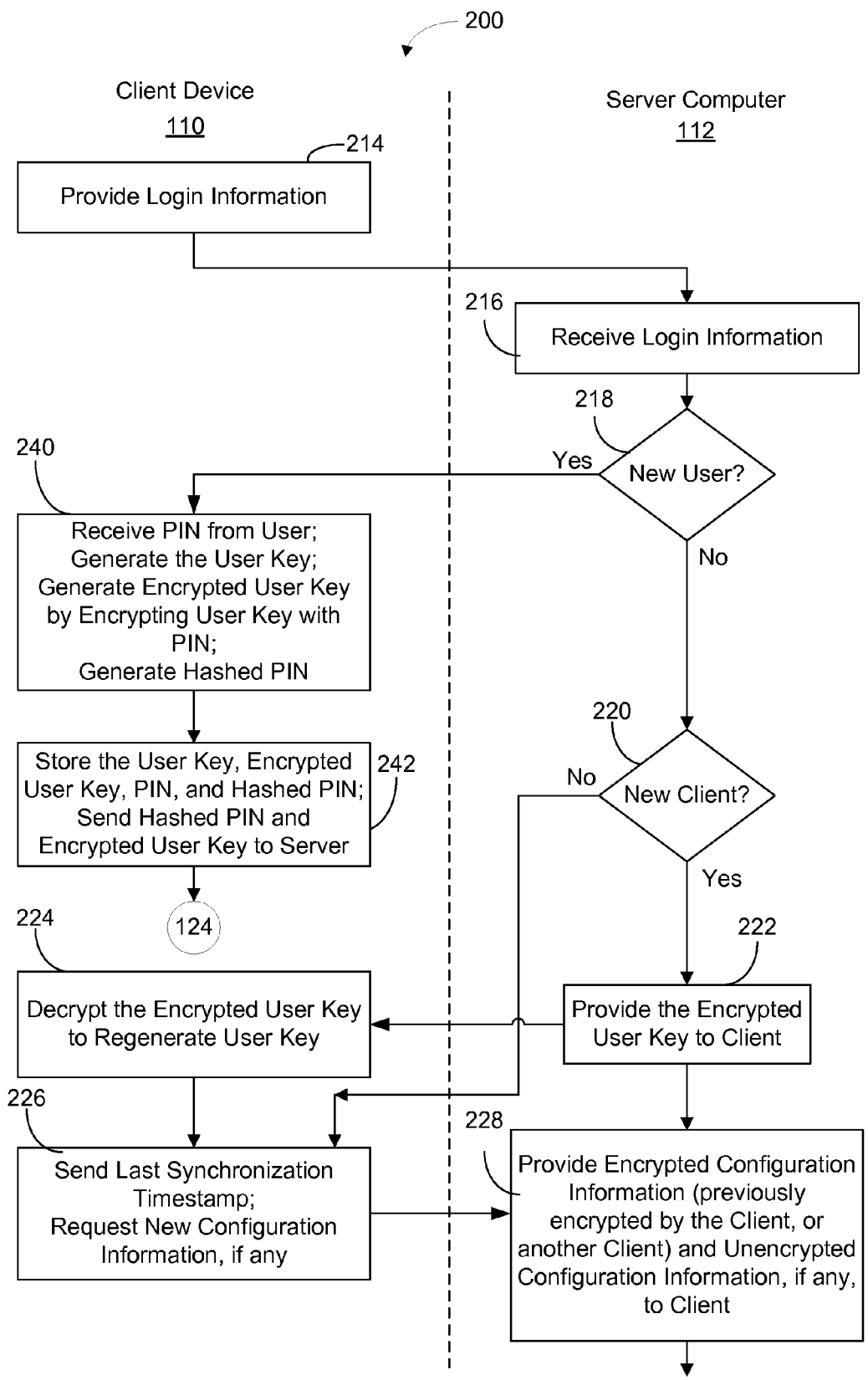
FIG. 2A is a flow diagram illustrating an embodiment of interaction between a client device and a server computer.
Figure 2B:
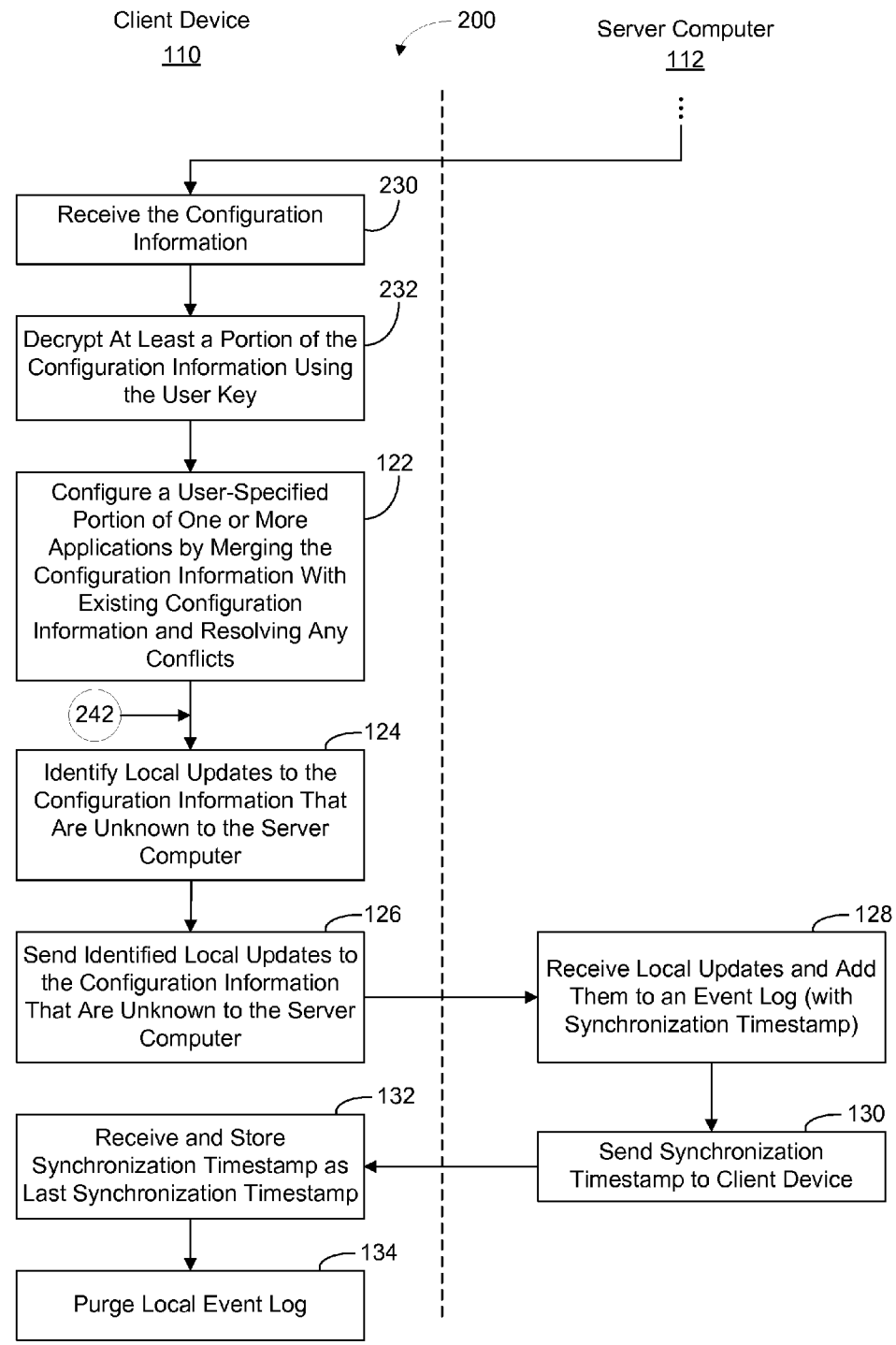
FIG. 2B is a flow diagram illustrating an embodiment of interaction between a client device and a server computer.

FIGS. 2A and 2B are flow diagrams illustrating of interactions between the client device 110 and the server computer 112 during the performance of a configuration information synchronization method 200. The user provides login information (214) at the client device 110. The login process is described above with reference to operations 114 and 116 of FIG. 1. The server computer 112 receives the login information (216) and determines whether the user is a previously registered user or a new user (218). This determination may be made during an authentication process.

If the user is not a new user, the server computer 112 also determines if the client device is a "new client" (220). A new client is typically a client device that has not previously synchronized configuration information with the server. However, a new client may also be one in which the synchronization client programs were deleted or corrupted and which have since been reinstalled. If the client is a new client (220-Yes), a copy of the encrypted user key for the user account is sent to the client device (222). Note that the login process (214, 216) must be successful in order for these operations to be performed. In some embodiments, the client must send the hashed user PIN to the server in order to receive the encrypted user key from the server. In these embodiments the hash PIN is used to authenticate the client device (i.e., to prove that it is sufficiently trustworthy) prior to sending it the encrypted user key. The client device decrypts the encrypted user key (224) so as to regenerate the user key. In some embodiments, the encrypted user key is decrypted by the client device using the user PIN for the user account. As described below, the user key is needed for decrypting encrypted configuration information sent by the server to the client device, and for encrypting some or all of the configuration information updates provided by the client device to the server.

In some embodiments, the server does not "determine" that the client is a new client. Instead, the synchronization client program in the client device determines that it must be a new client because it lacks a user key and/or last synchronization timestamp. In these embodiments, the client device sends a request to the server, requesting a copy of the encrypted user key for a specified user name. The server responds by sending to the client device a copy of the encrypted user key for the user account (222). As noted above, the client device decrypts the encrypted user key (224) so as to regenerate the user key.

Next, the client device sends to the server a "last synchronization timestamp" (226), which corresponds to a last or most recent time when the configuration information was synchronized between the client device and the server. If this is a new client, the last synchronization timestamp sent by the client device may have a default value (e.g., a timestamp corresponding to the time 00:00 on a predefined date, long in the past). In addition, the client device 110 requests new configuration information from the server (226). If the server has new configuration information, having timestamps after the timestamp of the last synchronization operation by the client device, the server provides the new configuration information to the client device (228). The new configuration information includes updates to the configuration information that have occurred since the last synchronization timestamp provided by the client device 110. In some embodiments, the new configuration information includes encrypted configuration information, previously encrypted by another client device associated with the user account. Optionally, the new configuration information includes unencrypted configuration information as well.

In some embodiments, a user specified set of synchronization preferences (860, FIG. 8) specifies what configuration information is to be synchronized (e.g., which applications, and which components of those applications), and also specifies which components of the configuration information is to be encrypted before it is sent to the server. However, in some embodiments, some components of the configuration information, such as saved passwords, is always encrypted because that information is inherently sensitive and in need of protection. In some other embodiments, all of the configuration information to be synchronized is encrypted so as to protect the privacy of the users.

Continuing in FIG. 2B, the configuration information is received (230) at the client device 110. The encrypted portions of the received configuration information are decrypted by the client device using the user key (232). At this point, the remainder of the synchronization process, starting at operation 122, is as described above with respect to FIG. 1. The configuration of one or more applications, or the portions of one or more applications, as specified by the user's synchronization preferences, as updated using the received configuration information, which merged with existing configuration information stored in the client device. Resolution of conflicts between the received configuration information and any pending configuration updates recorded in the client device's update log is discussed in more detail below.

Returning to FIG. 2A, if the user is a new user, the user is requested to provide a PIN (personal identification number). A user key is generated (222) by the client device using a random or pseudorandom process, and the resulting user key is encrypted using the user PIN so as to generate an encrypted user key. The user PIN is mapped by a one way function, such as a hash function, so as to produce a hashed PIN (240). The purpose of the hashed PIN is to validate the user and client each time the user logs into the synchronization server, without revealing the user PIN. The purpose of the encrypted user key is to enable distribution of the user key by the server, without the server having knowledge of the actual user key. In some embodiments, the user is requested to provide a user verification value other than a user PIN, and that user verification value is sent to the server (242) and later used to validate the user during subsequent logins with the server.

In some embodiments, the user key, the encrypted user key and the user's PIN are durably stored on the client device 110 (240). However, in some embodiments only the encrypted user key is durably stored on the client device. During subsequent synchronization sessions, the user provides the user PIN, and then the remaining values (i.e., the hashed PIN and the user key) are regenerated from the user PIN and the encrypted user key. In yet other embodiments, at least one of the user key and the encrypted user key are durably stored by the client device, and the hashed PIN is also durably stored by the client device.

The user name, the hashed PIN and the encrypted user key are all provided to the server (242) so as to establish a new user account at the synchronization server. Since the synchronization server has no configuration information to send to the client device at this point (because this is a new user account), the synchronization process moves to operation 124, as described above. With respect to operation 124, since the server has not yet received any configuration information for the user account, the "local updates" identified by the client device include all configuration information for the application components that the user has selected for synchronization.

After a first iteration of the synchronization process is completed, the client device 110 may provide additional updates to the server computer 112. The updates may be provided after a pre-determined time interval since a previous update has occurred, for example, after 1, 2, 5, 10, 30 or 60 minutes. In some embodiments, the updates may be event triggered, such as when the user modifies the configuration information for the one or more applications. In some embodiments, the updates may be provided in accordance with a pre-determined time interval and/or an event trigger. For example, in some embodiments, the client device 110 accumulates configuration changes in a queue until no new configuration changes occur for at least a threshold period of time (e.g., five seconds). Then the accumulated configuration changes are sent to the server computer 112, and this process repeats until the user logs off or the client device is disconnected from the server.

The server computer 112 receives the updates and stores the updates in an event log (128) for the user account. In addition, for each set of updates received by the server, the server sends a synchronization timestamp to the client device (130). The synchronization timestamp is durably saved by the client device (132) and the local event log is purged (134), thereby completing a respective iteration of the synchronization process. The second phase of the synchronization process (operations 124 through 134) continues to be repeated until the user logs out of the synchronization server, or until the connection between the client device and the server is broken. Thus, if the user remains logged in for hours, configuration changes are sent to the server as they occur (or substantially as they occur) at the client. Each such transfer of configuration updates from the client to the server produces an updated "last synchronization time" which is stored by the client for use when the user next logs into the server from the same client.

Encryption and decryption of configuration information occur solely at the client. In some embodiments, only configuration items (e.g., one or more types of configuration items, such as bookmarks, passwords, open tabs, open windows, cookies, user history, data for auto-completion of forms, and/or window layout information) specifically marked for encryption in the user's synchronization preferences are encrypted at the client before being sent to the server, and are decrypted when updates of those items are received from the server.

Furthermore, encryption key generation typically only occurs when a user establishes a new synchronization account with the server. And the user's encryption key is typically distributed to a client only when the user is establishing a new client, or when a client has lost some or all of its synchronization state information.

In other embodiments of the synchronization method 200, two or more operations may be combined and/or the order of the operations may be changed. The method 200 may include fewer operations or additional operations.

Figure 3A:
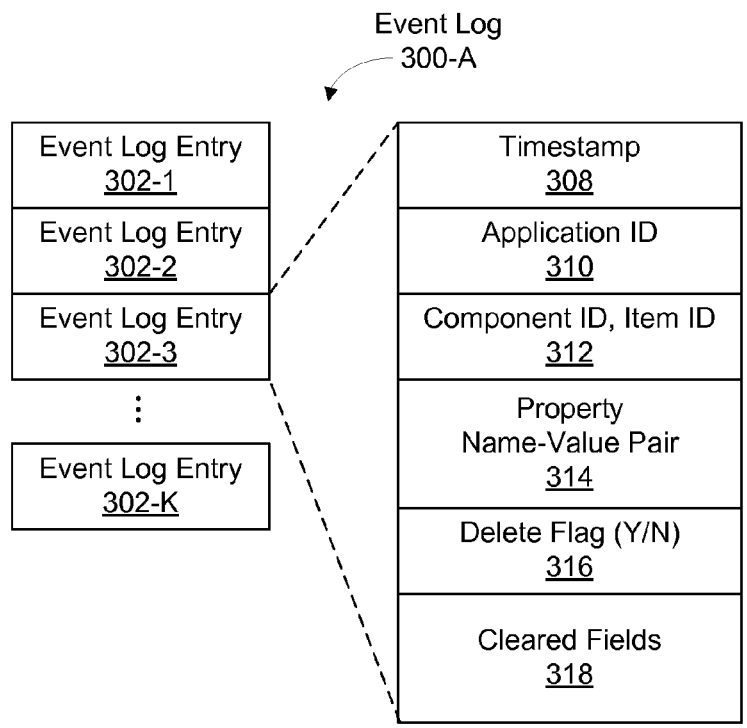
FIGS. 3A, 3B and 3C shows exemplary data structures for the event logs in a server computer.
Figure 3B:
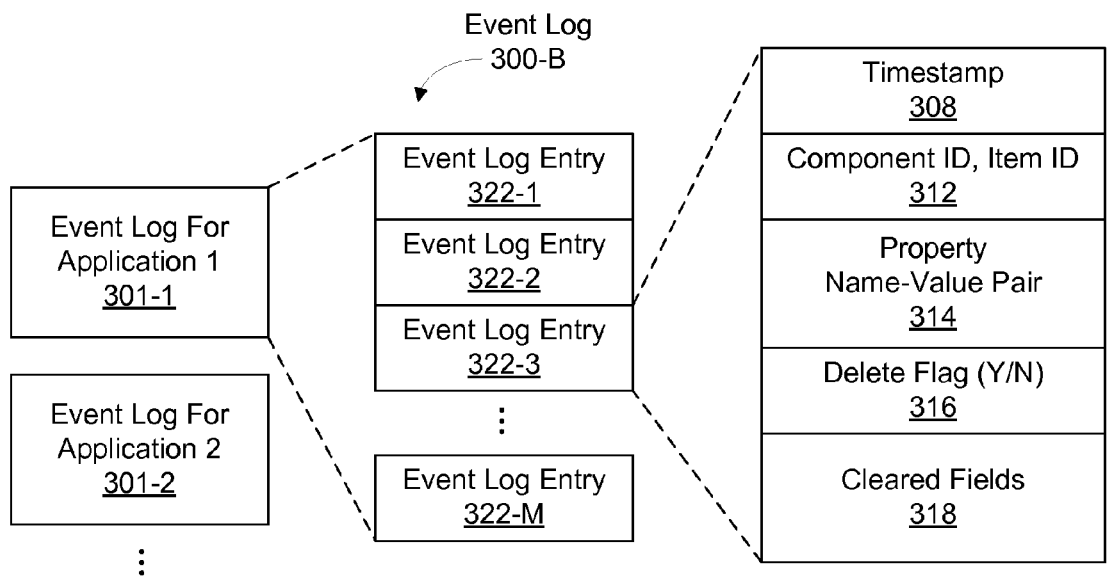
Figure 3C:
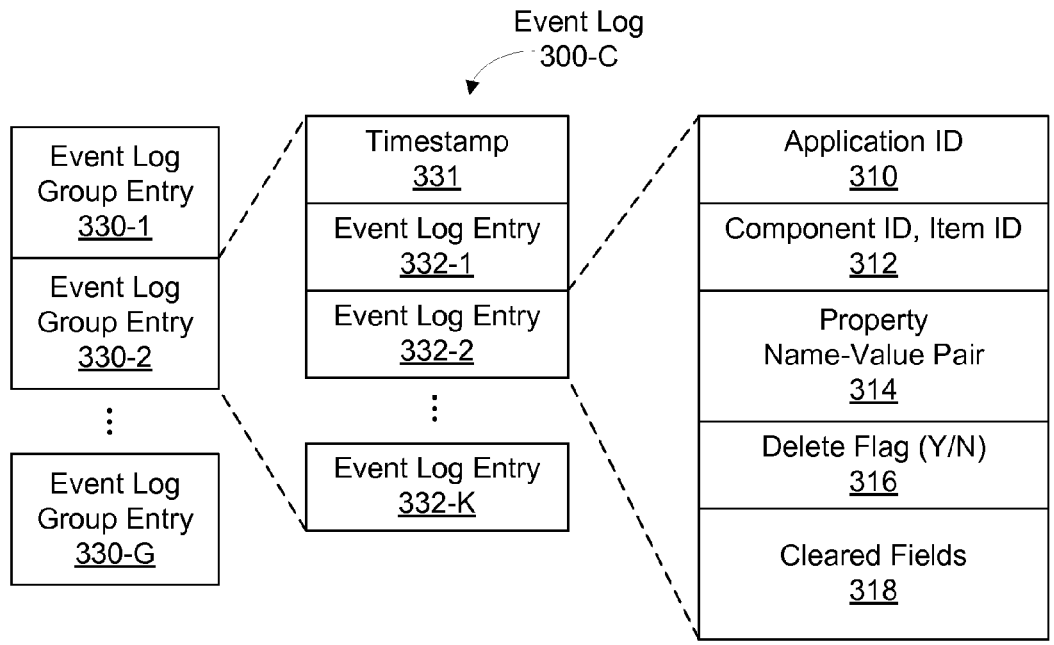
Figure 3D:
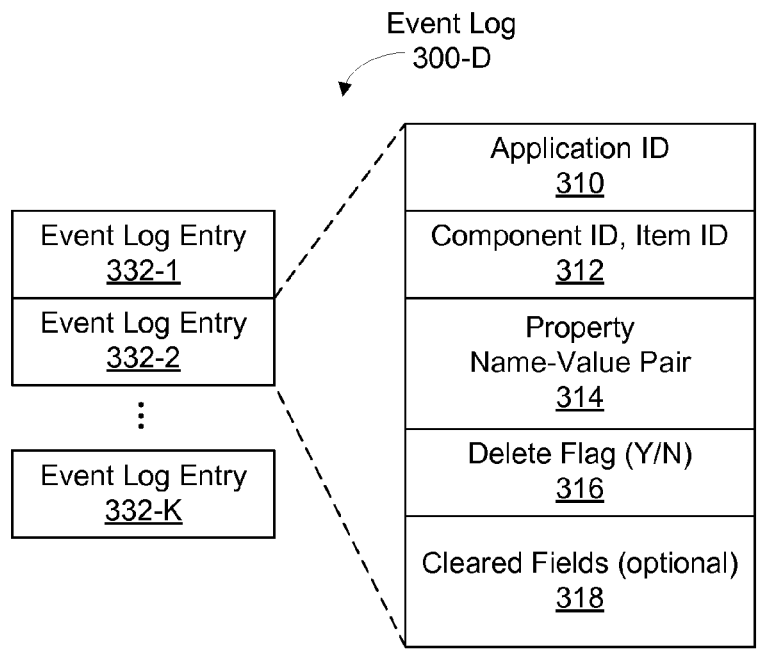
FIG. 3D shows an exemplary data structure for the event log in a client device.

FIGS. 3A, 3B and 3C shows exemplary data structures for the event logs in the server computer and FIG. 3D shows an exemplary data structures for the event log in a client device. As shown in FIG. 3A, an exemplary event log 300-A for a user account includes a sequence of event log entries 302 (302-1 to 302-K, where K is the number of entries). Each event log entry 302 contains information about a configuration change that occurred in a client device, and that is to be replicated in any other client devices associated with the user account. A single configuration change may sometime require more than one event log entry 302, for instance because it changes more than one property or field of a configuration value. In this exemplary event log, a respective event log entry 302 includes:

a timestamp 308, which is the time that the event log entry was received or processed by the server;

an application ID 310, which identifies the application for which a configuration value was changed; in embodiments in which the synchronization server is being used to synchronize configuration information for only one application, the event log entry 302 does not include an application ID 310;

component ID and item ID 312, are used to identify the type of component (i.e., the type of configuration value (e.g., bookmark, password, history item, etc.)) and the specific item of that type which has been modified;

property name-value pair 314, which identifies a specific property of the configuration item identified in field 312 and a value of that property;

a delete flag 316, which is set if the configuration item identified in field 312 has been deleted in its entirety; and cleared fields flags 318, which comprises a set of flags that indicate which fields or properties of the configuration item identified in field 312 have been cleared.

In some embodiments, the delete flag 316 may be omitted from a respective event log entry 302 if the identified configuration item has not been deleted. Similarly, in some embodiments the cleared flags 318 may be omitted from a respective event log entry 302 if none of the fields in the identified configuration item have been cleared by the configuration change represented by this event log entry. Furthermore, in some embodiments, the event log entries 302 do not include "cleared fields flags" 318. Instead, when a field of a configuration item is cleared by the user or by an application, the corresponding log entry 302 includes a corresponding property name-value pair 314 with a null value.

As shown in FIG. 3B, an exemplary event log 300-B for a user account includes a set of event logs 301 for different applications (e.g., a browser, email client, word processing program, or any other suitable application programs executed by the user's client devices). The event log 301 for a respective application includes a sequence of event log entries 322. Each of these event log entries 322 is similar to the event log entries 302 described above with reference to FIG. 3A, except that an application ID field 310 can be omitted from these event log entries—because all the event log entries 322 for a particular event log 301 correspond to a specific application.

As shown in FIG. 3C, an exemplary event log 300-C for a user account includes a sequence of event log group entries 330. Each event log group entry 330 includes all the configuration change information sent by a client device during a respective synchronization session or iteration. All of the event log entries 332 in the group entry 330 are assigned the same timestamp 331, which corresponds to the time at the server when the server received the configuration change information recorded in the group entry 330. Each of the event log entries 332 is similar to the event log entries 302 described above with reference to FIG. 3A, except that the timestamp 302 is omitted from these event log entries 332— because the timestamp 331 for the event log group entry 330 applies to all the event log entries 322 in the group.

As will be understood by those skilled in the art, the application-by-application segregation of event log information shown in FIG. 3B can also be used in a system that uses the data structures of FIG. 3C. In particular, in another embodiment, each application event log 301 of FIG. 3B includes the data structures shown in FIG. 3C.

FIG. 3D shows an exemplary event log 300-D that is stored in a client device. This event log 300-D includes a set of event log entries 332 (332-1 to 332-K, where K is the number of event log entries). Each event log entries includes the same fields as the event log entries 302 of FIG. 3A, except that in this embodiment the event log entries 332 in the client device's event log 300-D do not have timestamps. In some embodiments, timestamps are not needed in the client device's event log. Instead, the server assigns a timestamp to each group of configuration updates sent by the client device to the server. In some embodiments, configuration information for only one application is synchronized, and in these embodiments the event log entries 332 in the client device's event log 300-D do not include an application ID field 310. In some embodiments, the client device's event log entries 332 do not include "cleared fields flags" 318. Instead, when a field of a configuration item is cleared by the user or by an application, the corresponding log entry 332 includes a corresponding property name-value pair 314 with a null value.

When the client device encrypts configuration information updates before sending the updates to the server, the portions of the event log 300-D that are encrypted are the name-value pairs of the components whose values are to be encrypted. In some embodiments, the name of each name-value pair to be encrypted is encrypted separately from the value of the name-value pair. As a result, the server is able to consolidate updates to any particular configuration item when sending configuration information to a client, because it can locate the latest configuration value(s) for each named property, even though the names and the values of the item's properties are encrypted. Further, leaving the other portions of the event log records unencrypted enables the server to identify superseded configuration updates and exclude them from the information sent to the client devices, without compromising the privacy and security of the encrypted configuration information.

In some embodiments, the property name of each name-value pair to be sent from a client to server as encrypted data is encrypted "without salt" so that it will encrypt to the same value every time that it is encrypted. Encrypting the property name without salt enables the server to recognize property name-value pairs that have the same name, which enables data compaction by the server (as described elsewhere in this document) prior to sending updates to the client. On the other hand, the value in each name-value pair to be sent from a client to server as encrypted data is encrypted "with salt" so that it will encrypt to a different value every time that it is encrypted. The salt makes it impossible to correlate values across updates, which further protects the user's privacy.

In some other embodiments, additional portions of the configuration information may also be encrypted by the client devices prior to sending configuration updates to the server. As a result, the communication of the configuration updates from the server to the client devices may be somewhat less efficient than in the previously described embodiments, and the client devices may have to do additional work to merge the received configuration information updates into the locally stored configuration information.

Figure 4:
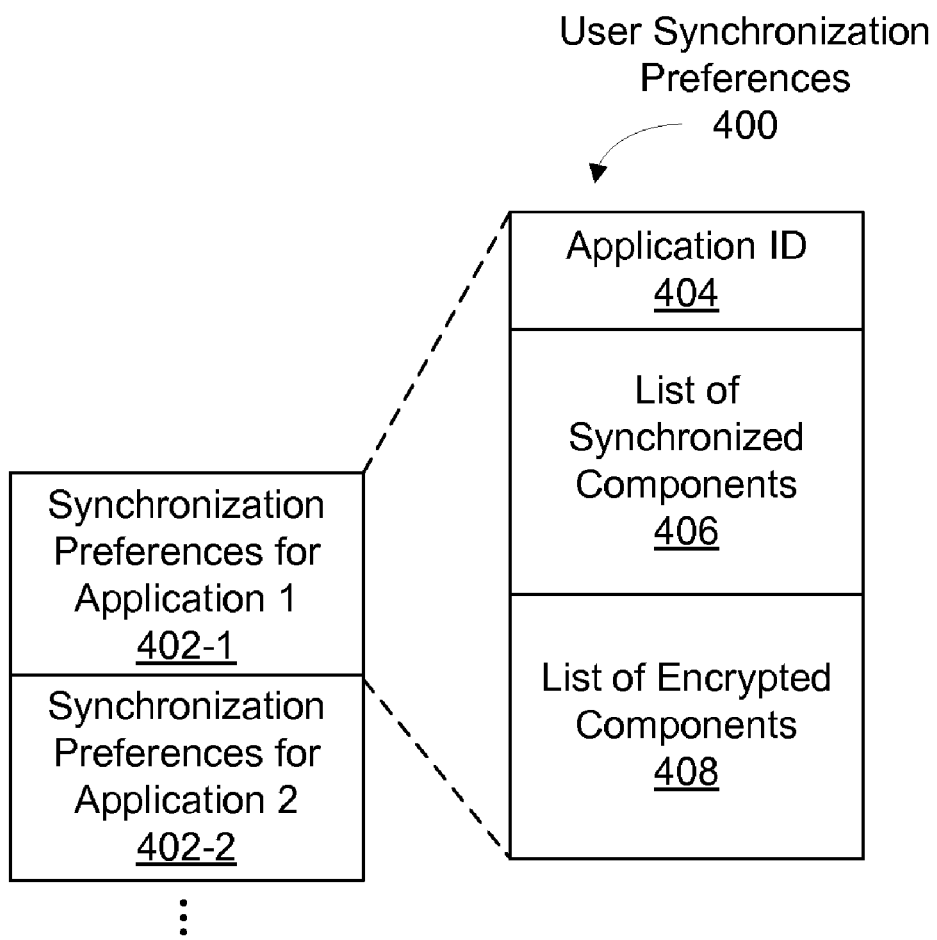
FIG. 4 shows an exemplary data structure for the user synchronization preferences.

FIG. 4 shows an exemplary data structure for the user synchronization preferences 400 of a user account. In some embodiments, user synchronization preferences 400 of a user account are treated as a type of configuration component that is synchronized between the user's client devices. As a result, the user synchronization preferences 400 for a user account are stored in the server's event log 300. Any updates to the user synchronization preferences 400 are stored as configuration updates in the event log 300. In other embodiments, the current values of the user synchronization preferences 400 are stored in the server, as well as in each of the client devices, as a separate file or other data structure. The preferences data structure 400 includes synchronization preferences 402 for one or more respective applications. The synchronization preferences 402 for a respective application may include an application ID 404, for identifying the application or application program to which the synchronization preferences apply. The synchronization preferences 402 for a respective application include a list 406 of synchronized components, indicating which components of the application are to be synchronized, and a list 408 of encrypted components, indicating which components are to encrypted prior to sending updates to the server. In an alternate embodiment, the synchronization preferences 402 for a respective application include synchronization and encryption flags for each distinct component or type of configuration information (e.g., bookmarks, passwords, toolbar options, etc.) used by the application; the flags indicating which type components are to be synchronized and which are to be encrypted. In some embodiments, certain types of configuration information (e.g., passwords) are always encrypted. If configuration information is being synchronized for only one application, the application ID 404 may be omitted from the synchronization preferences 400.

Figure 5:
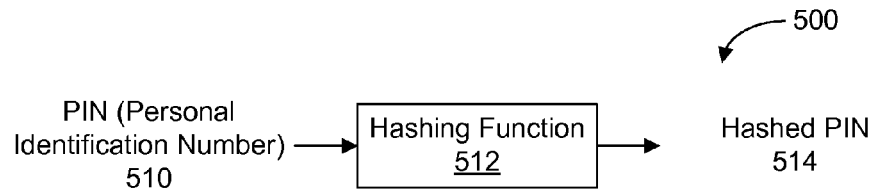
FIG. 5 is a block diagram illustrating the generation of a hashed PIN from a user PIN.

In some embodiments, the PIN (Personal Identification Number, sometimes called the "PIN number") provided by the user may be mapped (e.g., using a one-way hash function) to produce a hashed PIN. Since the hashed PIN is produced using a one-way function, storing the hashed PIN on the server does not reveal the user's PIN. This is illustrated in FIG. 5, which is a block diagram 500 illustrating an embodiment of hashing a user's PIN. A user's PIN 510 is input to a hashing function 512. A hashed PIN 514 is output.

Figure 6:
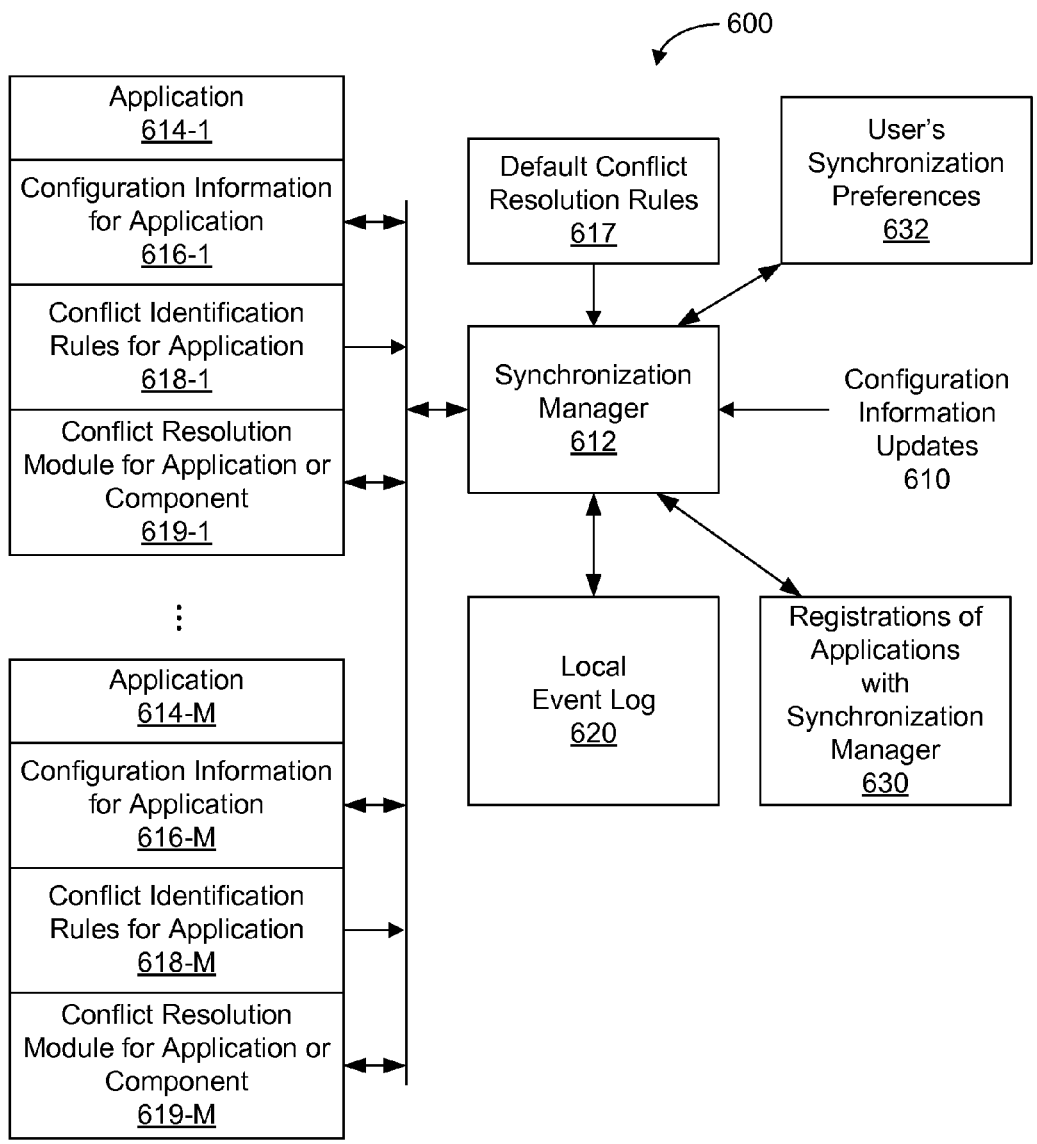
FIG. 6 is a block diagram illustrating operation of a synchronization manager in a client device.

FIG. 6 depicts a conceptual representation of a client device sub-system 600 in which configuration information updates 610, received from a server computer, are applied by a synchronization manager 612 to update the configuration state of one or more application programs 614 (sometimes called applications). In some embodiments, the applications 614 may include extensions or components of another program, such as a browser application. The synchronization manager 612 stores locally generated configuration changes in a local event log 620, and utilizes a set of conflict resolution rules 617 (sometimes herein called default conflict resolution rules) for resolving conflicts between configuration information updates received from the server and configuration updates recorded in the local event log 620, as well as conflicts between configuration information updates received from the server and the current configuration information 616 for any of the application programs 614. In some embodiments, conflict resolution is performed only when the client device receiving the changes has recorded at least one offline configuration information change.

In some embodiments, each of the applications 614 whose configuration information is to be synchronized is registered with the synchronization manager 612. The application registrations 630 identify the applications, and the components or types of the configuration information for each application that are capable of being synchronized among the user's client devices. The application registration 630 for a respective application may also specify the application-specific conflict identification rules 618 (e.g., 618-1, 618-M) that are to be used for identifying conflicts between competing configuration updates, and application-specific conflict resolution modules or instructions 619 (e.g., 619-1, 619-M) for resolving conflicts or potential conflicts identified in accordance with the conflict identification rules 618.

In some embodiments, the synchronization manager 612 applies a set of default conflict resolution rules 617 (discussed below) for identifying and resulting conflicts between configuration information updates received from the server and configuration updates recorded in the local event log 620. Additional application-specific conflict identification resolution rules (e.g., 618-1, 618-M) and application-specific conflict resolution modules (e.g., 619-1, 619-M) may supersede the default conflict resolution rules 617, or alternately may identify additional types of conflicts (e.g., between configuration information updates received from the server and the current configuration information 616 for an application programs 614) and rules for their resolution. In some embodiments, the set of applications or application components for which configuration information is synchronized can be expanded by registering with the synchronization manager 612 one or more application-specific conflict identification rules 618 for each additional application. The new conflict identification rules 618 must be registered with the synchronization manager 612 at each client device of the user to enable synchronization of the additional type(s) of configuration information among the user's client devices. The addition of one or more type(s) of configuration information to be synchronized will also be reflected in the synchronization preferences 400 of the client device and in the client device's event log 300-D. As a result, the updated synchronization preferences 400 will be automatically replicated to all other client devices which synchronize to the same user account.

In some embodiments, the default conflict resolution rules 618-0 include:

Basic Conflict Resolution Rule: whenever a configuration change received from the server conflicts with a configuration change in the client device's event log, accept the change in the client device's event log and reject the configuration change received from the server, unless another rule supersedes this rule; and Avoid Deletions Rule: whenever two conflicting configuration changes include a deletion and a non-deletion update, reject the deletion and accept the non-deletion update; this rule supersedes the Basic Conflict Resolution Rule. Whenever a configuration item deletion received from the server is rejected, the synchronization manager creates one or more log entries in the local event log 620 so as to totally refresh the configuration item that is the subject of the conflict (e.g., by treating all fields of the configuration item as having been updated in the client device to their current values).

In some embodiments, the application-specific conflict identification rules 618-1 and conflict resolution module(s) 619-1 for at least one component of one application include:

Avoid Duplicate Configuration Items: whenever a configuration update received from the server would cause the creation of a duplicate of a configuration item for which no duplicate should exist (e.g., two bookmarks folders with the same name, or two bookmarks in the same folder having the same URL), reject the update. Different versions of this conflict identification rule and resolution module may be utilized by different applications, or by different components of the same application. In some embodiments, whenever a configuration update from the server is rejected as conflicting with the "no-duplicates rule", one or more corresponding log entries may be added to the local event log by the synchronization manager so as to override the offending entries in the event log of the server. In some embodiments, the "Avoid Duplicate Configuration Items" for a particular type of component of a respective application resolves at least some potential conflicts by creating a new configuration item that does not violate the rule, and then adding corresponding information to the local event log 620 of the client device.

As noted above, the synchronization manager 612 resolves each configuration change conflict using predefined conflict rules for the respective application. The conflict rules for each respective application may be defined by a developer of the respective application. Such predefined conflict rules may be referred to as registered conflict conditions. Each registered conflict identification rule defines conflict conditions, or potential conflict conditions that are to be identified by the synchronization manager 612. When any such conflict or potential conflict condition is detected, the synchronization manager 612 transfers control to the corresponding conflict resolution module or instructions 619, which may reject or accept a received configuration update or may perform additional actions (e.g., renaming, moving or otherwise modifying a configuration component) in order to resolve a conflict.

Figure 7:
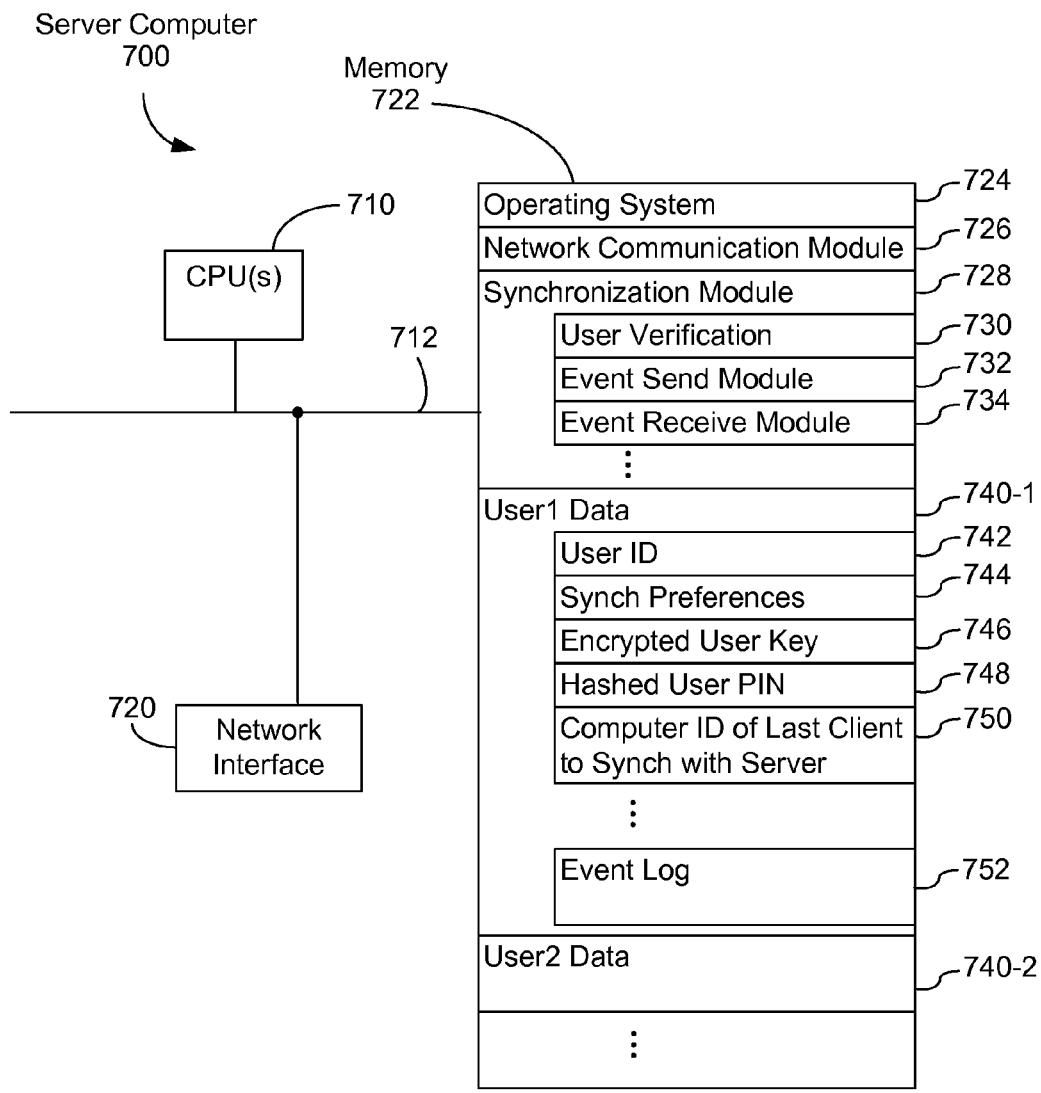
FIG. 7 is a block diagram illustrating an embodiment of a server computer.

Attention is now directed towards hardware and systems that may utilize and/or implement synchronization of configuration information, such as the method 100, 200, 300, 400, 500 and/or 600 described above. FIG. 7 is a block diagram illustrating an embodiment of a server computer 700. The server computer 700 may include at least one data processor or central processing unit (CPU) 710, a communications or network interface 720 for communicating with other computers, server computers and/or client devices, a memory 722 and one or more communication buses or signal lines 712 for coupling these components to one another. The communication buses 712 may include circuitry (sometimes called a chipset) that interconnects and controls communications between system components.

Memory 722 may include high-speed random access memory, such as DRAM, SRAM, DDR RAM or other random access solid state memory devices, and/or non-volatile memory, such as one or more magnetic disk storage devices, optical disk storage devices, flash memory devices, or other non-volatile solid state storage devices. Memory 722 may store an operating system 724, such as LINUX, UNIX, MAC OS, or Windows, that includes procedures (or a set of instructions) for handling basic system services and for performing hardware dependent tasks. Memory 722 may also store communication procedures (or a set of instructions) in a network communication module 726. The communication procedures are used for communicating with one or more client devices.

Memory 722 may also include a synchronization module 728, for exchanging configuration update information with client devices, and user data 740 for users who have established synchronization accounts with the server. The synchronization module 728 includes a user verification procedure or instructions 730, for verifying the identify and authenticity of a user logging into the server 700;

an event send module 732, for sending configuration changes to a client device; details of the operation of the event send module 732 are described above with reference to operation 120 of the method 100 shown in FIG. 1; and an event receive module 734, for receiving configuration changes from a client device and storing those configuration changes in the server (e.g., in an event log 752 for the corresponding user), as described above with reference to operation 128 of the method 100 shown in FIG. 1.

In some embodiments, the user data 740 for each user having a synchronization account (sometimes herein called a user account) with the server includes:

a user identifier (user ID) 742, which uniquely identifies the user;

synchronization preferences 744, which identify the types of configuration information in one or more applications that are to be synchronized across the client devices used by the user; in some embodiments, the synchronization preferences 744 also identify which types of configuration information are to be sent to the server as encrypted information; as noted above, in some embodiments the synchronization preferences 744 for a particular user are not stored in the server as a separate data structure, and instead changes to the user's synchronization preferences are stored in the event log 752 for the user account;

encrypted user key 746, which is an encrypted version of the user key for the user account; the corresponding user key is not stored or known to the server 700 and is used only by the client devices of the user account to encrypt and decrypt configuration information sent and received to and from the server 700;

an optional hashed user PIN 748, which is a hashed version of the user PIN of the user account; the hashed user PIN 748 is used to verify the identity and authenticity of the user during log in;

computer ID 750 of the last client device to synchronize with the server; and an event log 752, as described in more detail above.

Modules and applications identified above correspond to a set of instructions for performing one or more functions described above. These modules (i.e., sets of instructions) need not be implemented as separate software programs, procedures or modules. The various modules and sub-modules may be rearranged and/or combined. The above identified data structures need not be implemented separately. The various data structures may be rearranged and/or combined. Memory 722 may include additional data structures, modules and/or sub-modules, or fewer data structures, modules and/or sub-modules. Memory 722, therefore, may include a subset or a superset of the above identified data structures, modules and/or sub-modules. For example, if the number of user accounts is large, the user data 740 may be stored on multiple computers, with the user data for each user account typically being stored on a single one of the computers, thereby spreading the data storage load and the synchronization services load over multiple server computers. In this example, a copy of the server synchronization module would be stored on each of the server computers.

Figure 8:
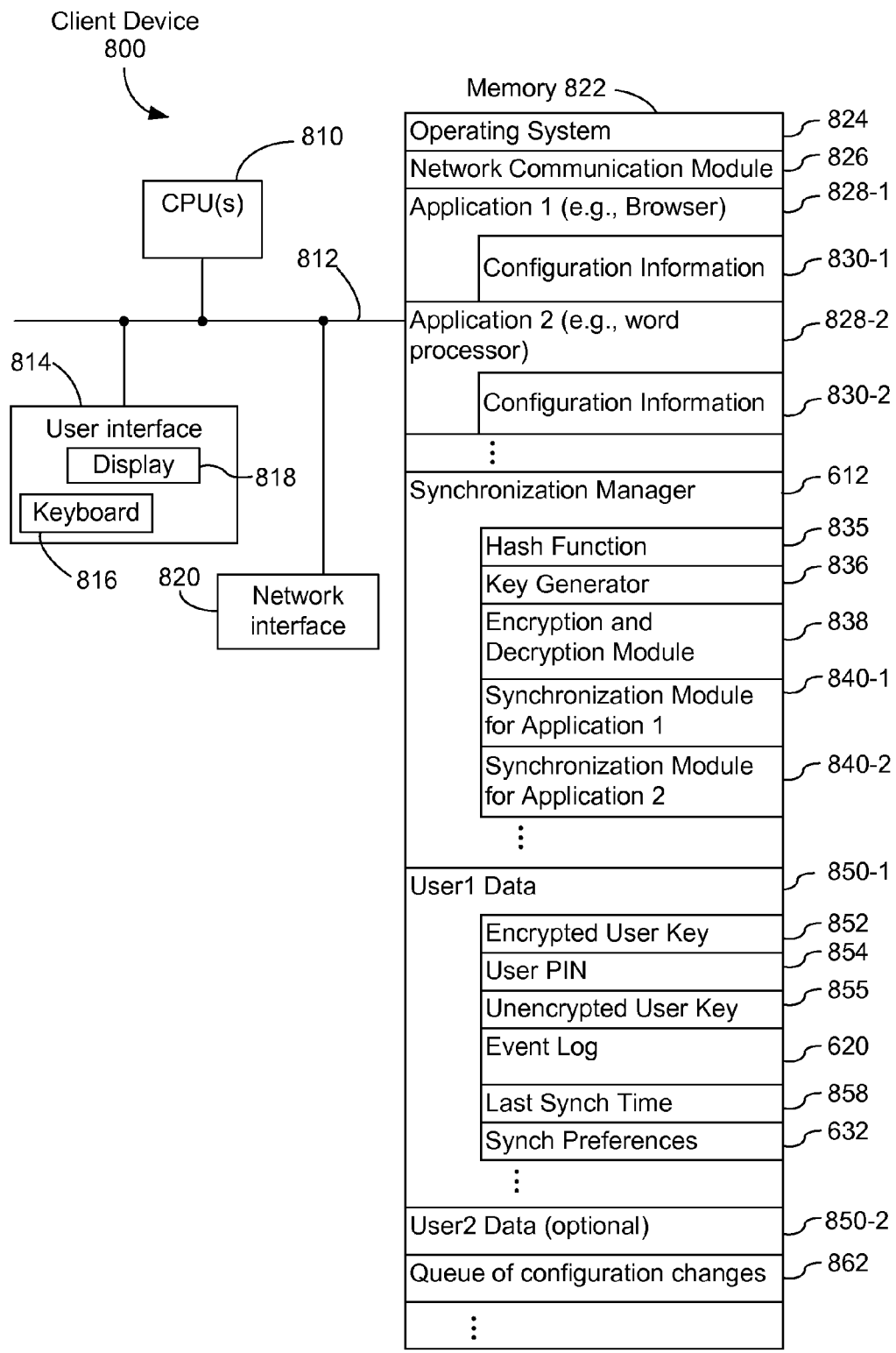
FIG. 8 is a block diagram illustrating an embodiment of a client device.

FIG. 8 is a block diagram illustrating an embodiment of a client device 800. The client device 800 may include at least one data processor or central processing unit (CPU) 810, one or more optional user interfaces 814, a communications or network interface 820 for communicating with other computers, server computers and/or client devices, a memory 822 and one or more communication buses or signal lines 812 for coupling these components to one another. The user interface 814 may have one or more keyboards 816, one or more pointer devices (not shown), such as a mouse, and/or one or more displays 818. The communication buses 812 may include circuitry (sometimes called a chipset) that interconnects and controls communications between system components.

Memory 822 may include high-speed random access memory, such as DRAM, SRAM, DDR RAM or other random access solid state memory devices, and/or non-volatile memory, such as one or more magnetic disk storage devices, optical disk storage devices, flash memory devices, or other non-volatile solid state storage devices. Memory 822 may store an operating system 824, such as LINUX, UNIX, MAC OS, or Windows, that includes procedures (or a set of instructions) for handling basic system services and for performing hardware dependent tasks. Memory 822 may also store communication procedures (or a set of instructions) in a network communication module 826. The communication procedures are used for communicating with one or more server computers.

Memory 822 also stores at least one application (e.g., a browser application) 828-1, and its configuration information or state 830-1, and may optionally include one or more additional applications 828-2 and configuration information 830-2 for each such additional application. A synchronization manager 612 handles or manages synchronization of configuration information in the client device 800. User data 850 is stored for each user of the client 800 who has a registered user account with the synchronization server. A queue 862 may optionally be used for temporarily storing configuration changes (e.g., bursts of configuration changes that occur over a short period of time) before they are sent to the synchronization server.

The synchronization manager 612 may include:
a hash function 835, or other one-way function, for mapping a user PIN into a hash PIN;
a key generator 836, for generating a user key to be used for encrypting and decrypting some or all of the configuration information sent to and received from the synchronization server; in some embodiments the key generator 836 generates a key pair, with one key for encrypting and another key for decrypting configuration information;
an encryption and decryption module 838, for encrypting and decrypting some or all of the configuration information sent to and received from the synchronization server; the encryption and decryption module 838 may also be used for encrypting the user key to produce an encrypted user key to be sent to the synchronization server, and for decrypting the encrypted user key so as to regenerate the user key (e.g., when synchronizing configuration information on a new client for the first time);
a synchronization module 840-1 for the first application 828-1; and
optionally, one or more additional synchronization modules 840-2 for a additional applications 828-2.

The synchronization module 840-1 or modules 840 correspond to the application-specific conflict identification rules 618-1, 618-M and conflict resolution modules 619-1, 619-M of FIG. 6.

The user data 850 stored in the client for a corresponding application 828 may include:
the aforementioned encrypted user key 852;
the user key 855 (i.e., the unencrypted or clear text user key);
a user PIN 854, which may be stored either durably, or temporarily while the user is logging in to the synchronization server; alternately, or in addition, the hashed PIN may be stored in a respective client device 800 as part of the user data 850;
an event log 856 reflecting changes to the configuration data of one or more applications;
a last synchronization time 858, which is the last time that the client 800 completed a successful synchronization operation with the synchronization server; and
the user's synchronization preferences 632. The synchronization preferences 632 specify the types of configuration information to be synchronized (e.g., cookies, bookmarks, history (URLs visited and/or search queries), and saved passwords), and which types of configuration information are to be encrypted prior to being sent to the synchronization server. In some embodiments, some types of information, such as cookies and saved passwords, are always encrypted prior to being sent to the synchronization server, while other types of configuration information (e.g., bookmarks, history) are encrypted only if the user chooses to have those types of configuration information encrypted.

Modules and applications identified above correspond to a set of instructions for performing one or more functions described above. These modules (i.e., sets of instructions) need not be implemented as separate software programs, procedures or modules. The various modules and sub-modules may be rearranged and/or combined. The above identified data structures need not be implemented separately. The various data structures may be rearranged and/or combined. Memory 822 may include additional data structures, modules and/or sub-modules, or fewer data structures, modules and/or sub-modules. Memory 822, therefore, may include a subset or a superset of the above identified data structures, modules and/or sub-modules.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for providing configuration information, comprising:
at a server computer having one or more processors and memory storing programs executed by the one or more processors:
receiving, respectively, a user identifier and a last synchronization timestamp from a first client device at the server computer using a network;
identifying, at the server computer, configuration information associated with the user identifier and having a timestamp after the last synchronization timestamp provided by the first client device;
providing the identified configuration information to the first client device using the network, wherein the identified configuration information is to configure a user-specified portion of one or more applications on the first client device by merging with existing configuration information for the one or more applications on the first client device;
receiving, from the first client device, information corresponding to resolution of at least one conflict between the configuration information from the server computer and the existing configuration information at the first client device;
determining a new synchronization timestamp for the conflict resolution information received from the first client device; and
returning the new synchronization timestamp to the first client device to replace the first client device's last synchronization timestamp.

2. The method of claim 1, wherein the configuration information provided to the first client device includes encrypted configuration information previously received from a second client device, and the encrypted configuration information has been encrypted by the second client device using a user key associated with the user identifier, and wherein an encrypted user key, comprising a version of the user key that has been encrypted, is received from the second client device at the server computer and provided to the first client device by the server computer.

3. The method of claim 2, further including prior to providing the identified configuration information to the first client device using the network,
receiving the encrypted user key from the second client device; and
storing the encrypted user key at the server computer.

4. The method of claim 2, wherein the encrypted user key comprises the user key encrypted by a user PIN.

5. The method of claim 1, wherein receiving the user identifier includes receiving an encrypted value from the first client device, and validating the user only if the received encrypted value matches a stored encrypted value associated with the user identifier.

6. The method of claim 5, further including, prior to receiving the user identifier, receiving and storing said encrypted value associated with the user identifier.

7. The method of claim 1, further comprising, prior to receiving the user identifier, receiving and storing a user verification value associated with the user identifier;
wherein receiving the user identifier includes receiving a value from the first client device, and validating the user only if the received value matches the stored user verification value associated with the user identifier.

8. The method of claim 1, further comprising receiving an update from the first client device at the server computer, wherein the update corresponds to one or more changes in configuration information at the first client device in accordance with user activity; and storing the update in an event log.

9. The method of claim 8, further comprising:
receiving the user identifier from a second client device at the server computer using the network; and
providing configuration information to the second client device using the network, the configuration information provided to the second client device including the configuration update received from the first client device.

10. The method of claim 8, further comprising determining, at the server, a set of configuration updates since a specified time, excluding any configuration updates superseded by later configuration updates, and sending the determined set of configuration updates to the first client device.

11. The method of claim 8, further comprising storing configuration information for a plurality of respective users in respective event logs, each event log including a sequence of configuration updates received from one or more client devices.

12. The method of claim 1, wherein the one or more applications correspond to application components for which conflict identification rules have been registered.

13. The method of claim 1, wherein the configuration information includes a browser state.

14. The method of claim 13, wherein the browser state includes at least two types of items selected from the group consisting of bookmarks, passwords, open tabs, open windows, cookies, user history, data for auto-completion of forms, and window layout information.

15. The method of claim 1, wherein the configuration information is used by an application integrated with a browser on the first client device.

16. The method of claim 1, further comprising rejecting the user identifier from the first client device when another client device has previously logged in using the same user identifier and remains logged in.

17. The method of claim 16, further comprising receiving logout information from the first client device prior to accepting login information from a second client device.

18. The method of claim 1, further comprising:
at the server computer:
determining a new synchronization timestamp for the conflict resolution information received from the first client device; and
returning the new synchronization timestamp to the first client device to replace the first client device's last synchronization timestamp.

19. A system, comprising:
one or more central processing units to execute programs;
memory; and
one or more programs, stored in the memory and executed by the processor, the one or more programs including:
instructions for receiving, respectively, a user identifier and a last synchronization timestamp from a first client device at a server computer using a network;
instructions for identifying, at the server computer, configuration information associated with the user identifier and having a timestamp after the last synchronization timestamp provided by the first client device;
instructions for providing the identified configuration information to the first client device using the network, wherein the identified configuration information is to configure a user-specified portion of one or more applications on the first client device by merging with existing configuration information for the one or more applications on the first client device;
instructions for receiving, from the first client device, information corresponding to resolution of at least one conflict between the configuration information from the server computer and the existing configuration information at the first client device;
instructions for determining a new synchronization timestamp for the conflict resolution information received from the first client device; and
instructions for returning the new synchronization timestamp to the first client device to replace the first client device's last synchronization timestamp.

20. The system of claim 19, wherein the configuration information provided to the first client device includes encrypted configuration information previously received from a second client device, and the encrypted configuration information has been encrypted by the second client device using a user key associated with the user identifier, and wherein an encrypted user key, comprising a version of the user key that has been encrypted, is received from the second client device at the server computer and provided to the first client device by the server computer.

21. The system of claim 20, wherein the one or more programs further include: instructions for prior to providing the identified configuration information to the first client device using the network, receiving the encrypted user key from the second client device and storing the encrypted user key at the server computer.

22. The system of claim 20, wherein the encrypted user key comprises the user key encrypted by a user PIN.

23. The system of claim 22, wherein the instructions for receiving the user identifier include instructions for receiving an encrypted value from the first client device, and validating the user only if the received encrypted value matches a stored encrypted value associated with the user identifier.

24. The system of claim 19, wherein the one or more programs further include:

instructions for receiving a configuration update from the first client device at the server computer, wherein the configuration update corresponds to one or more changes in configuration information at the first client device in accordance with user activity; and instructions for storing the configuration update in an event log.

25. The system of claim 24, wherein the one or more programs further include:

instructions for determining, at the server, a set of configuration updates since a specified time, excluding any configuration updates superseded by later configuration updates, and sending the determined set of configuration updates to the first client device.

26. The system of claim 24, wherein the one or more programs further include instructions for storing configuration information for a plurality of respective users in respective event logs, each event log including a sequence of configuration updates received from one or more client devices.

27. A computer program product, for use in conjunction with a computer system, the computer program product comprising memory and one or more programs, stored in the memory, the one of more programs including:

instructions for receiving, respectively, a user identifier and a last synchronization timestamp from a first client device at a server computer using a network;

instructions for identifying, at the server computer, configuration information associated with the user identifier and having a timestamp after the last synchronization timestamp provided by the first client device;

instructions for providing the identified configuration information to the first client device using the network, wherein the identified configuration information is to configure a user-specified portion of one or more applications on the first client device by merging with existing configuration information for the one or more applications on the first client device;

instructions for receiving, from the first client device, information corresponding to resolution of at least one conflict between the configuration information from the server computer and the existing configuration information at the first client device;

instructions for determining a new synchronization timestamp for the conflict resolution information received from the first client device; and instructions for returning the new synchronization timestamp to the first client device to replace the first client device's last synchronization timestamp.

28. The computer program product of claim 27, wherein the configuration information provided to the first client device includes encrypted configuration information previously received from a second client device, and the encrypted configuration information has been encrypted by the second client device using a user key associated with the user identifier, and wherein an encrypted user key, comprising a version of the user key that has been encrypted, is received from the second client device at the server computer and provided to the first client device by the server computer.

29. The computer program product of claim 28, wherein the one or more programs further include: instructions for prior to providing the identified configuration information to the first client device using the network, receiving the encrypted user key from the second client device and storing the encrypted user key at the server computer.

30. The computer program product of claim 28, wherein the encrypted user key comprises the user key encrypted by a user PIN.

31. The computer program product of claim 27, wherein the instructions for receiving the user identifier include instructions for receiving a hashed PIN from the first client device, and validating the user only if the received hashed PIN matches a stored hashed PIN associated with the user identifier.

32. The computer program product of claim 27, wherein the one or more programs further include:

instructions for receiving a configuration update from the first client device at the server computer, wherein the configuration update corresponds to one or more changes in configuration information at the first client device in accordance with user activity; and instructions for storing the configuration update in an event log.

33. The computer program product of claim 32, wherein the one or more programs further include:

instructions for determining, at the server, a set of configuration updates since a specified time, excluding any configuration updates superseded by later configuration updates, and sending the determined set of configuration updates to the first client device.

34. The computer program product of claim 32, wherein the one or more programs further include instructions for storing configuration information for a plurality of respective users in respective event logs, each event log including a sequence of configuration updates received from one or more client devices.

35. A method for providing configuration information, comprising:

at a server computer having one or more processors and memory storing programs executed by the one or more processors:

at distinct times receiving, respectively, a user identifier and a last synchronization timestamp for each respective client device of a plurality of client devices used by a same user, at the server computer using a network, each respective client device having a distinct last synchronization timestamp;

identifying, at the server computer, configuration information associated with the user identifier and having a timestamp after the corresponding last synchronization timestamp provided by the respective client device;

providing the identified configuration information to the respective client device using the network, wherein the identified configuration information is to configure a user-specified portion of one or more applications on the respective client device by merging with existing configuration information for the one or more applications on the respective client device;

receiving, from the respective client device, information corresponding to resolution of at least one conflict between the configuration information from the server computer and the existing configuration information at the respective client device;

determining a new synchronization timestamp for the conflict resolution information received from the respective client device; and returning the new synchronization timestamp to the respective client device to replace the respective client device's last synchronization timestamp.

* * * * *